2 Sheets—Sheet 1.
D. E. SOMES.
Apparatus for Ventilating and Cooling Grain.
No. 8,221. Reissued May 7, 1878.
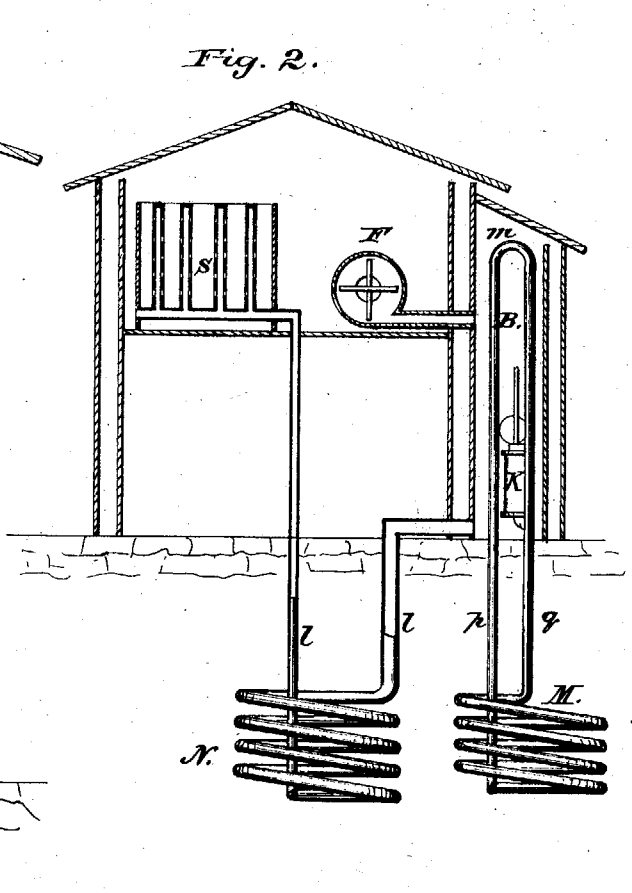
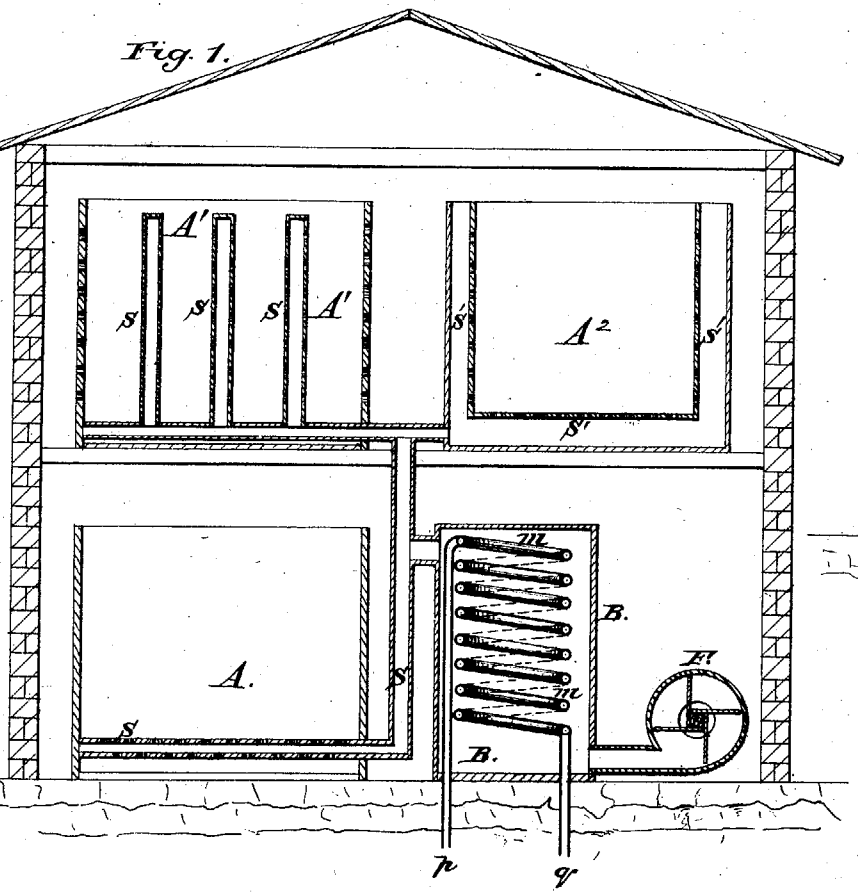
Attest:
Byron R. Somes.
H. L. Perrine.
Inventor:
D. E. Somes, per
Frank Case Somes,
Attorney 2 Sheets—Sheet 2.
D. E. SOMES.
Apparatus for Ventilating and Cooling Grain.
No. 8,221. Reissued May 7, 1878.
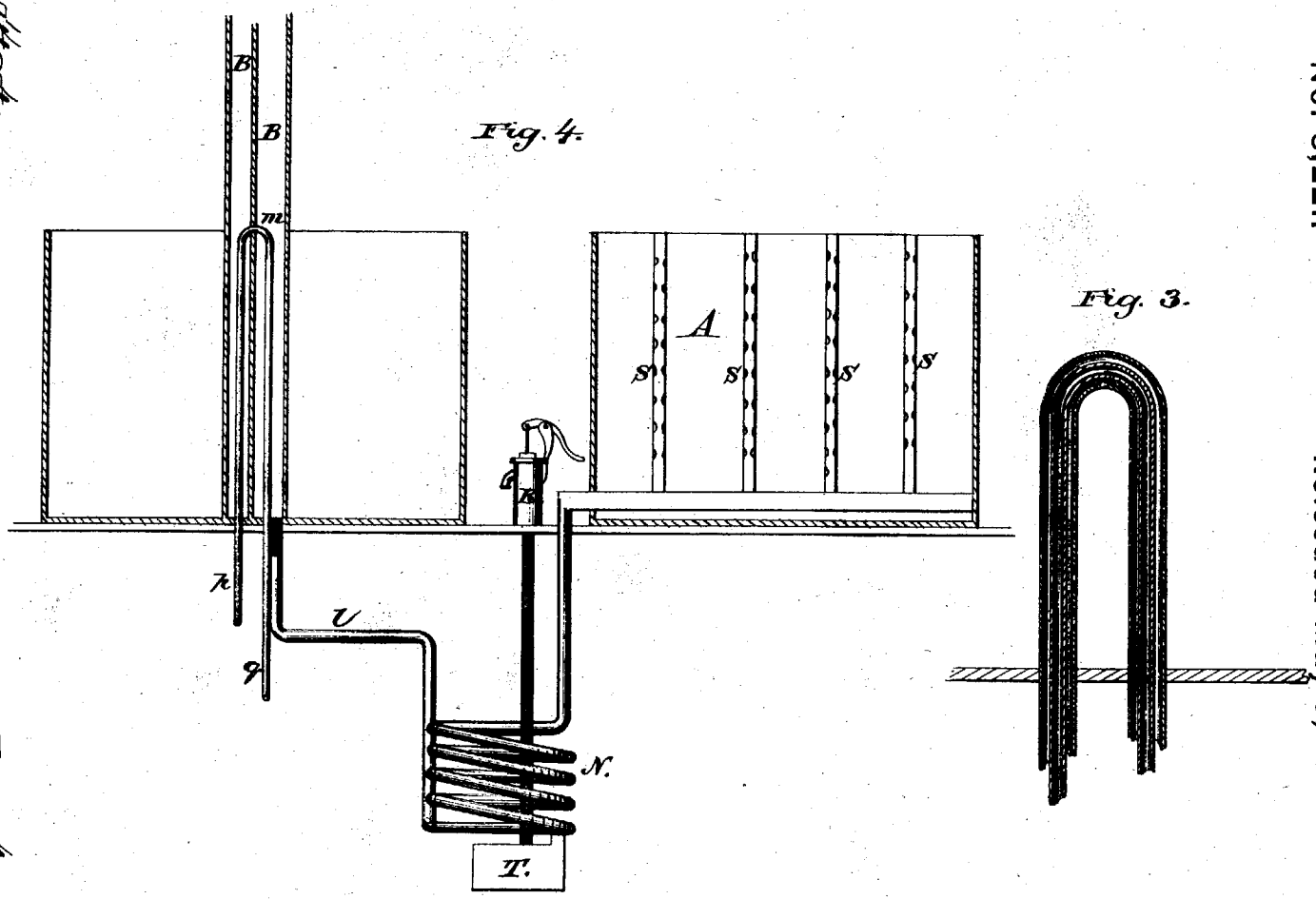
Attest:
Byron R. Somes.
H. L. Perrine.
Inventor:
D. E. Somes, per
Frank Chas. Somes,
Attorney.

UNITED STATES PATENT OFFICE.

DANIEL E. SOMES, OF WASHINGTON, DISTRICT OF COLUMBIA.

IMPROVEMENT IN APPARATUS FOR VENTILATING AND COOLING GRAIN.

Specification forming part of Letters Patent No. 46,950, dated March 21, 1865; Reissue No. 8,221, dated May 7, 1878; application filed April 11, 1878.

*To all whom it may concern:*

Be it known that I, DANIEL E. SOMES, of the city of Washington, in the District of Columbia, have made a new and useful Improvement in Cooling, Drying, and Ventilating Granaries, Store-Houses, and other buildings in which wheat, Indian corn, oats, rice, barley, and other breadstuffs are to be kept; and I hereby declare that the following is a full and exact description of the same, reference being had to the annexed drawings, making a part of this specification.

The nature of this invention consists in constructing buildings for storing grain and other like substances in such a manner that they may be cooled, dried, and ventilated throughout, and so that the substances stored in them shall be preserved in sound condition without the necessity of removing or handling them.

It is well known that grain cannot be stored in bulk without great danger of being spoiled or injured by heating, mold, fermentation, the development of insects, and other injurious effects which arise from keeping a mass of grain in a closed apartment. To avoid the danger of spoiling as much as possible it is usual to dry the grain in stoves, ovens, grain-driers, and the like, also to handle the grain by moving it from one part of the building to another part. These operations are expensive, and are not always successful, especially if it is necessary to keep the grain in store for a long time. Besides, it is difficult to dry grain by means of kilns, furnaces, and the like without injuring it to some extent.

The object of my invention is to construct granaries, or buildings in which grain is to be stored, so that the grain may at all times and at any time be cooled, dried, and ventilated, so that the grain may be left for any desirable length of time in store without danger of spoiling, and without the necessity of handling or removing it.

The following description will enable others to construct and use my invention.

The walls, roof, and floor of the building, and also of the separate apartments or bins, may be constructed in the manner usual in this class of buildings, or they may be made multiple, with spaces between for air or other non-conducting material, as fully set forth in the specification of my patent for improvements in securing a uniform temperature in packing-houses, &c., dated September 13, 1864. The arrangement of the bins and apartments in their general features may also conform to the plans usual in the best constructed granaries, and should contain the devices and machinery suitable for introducing and removing the grain in the best manner. These, however, it is not necessary to specify, as my invention relates only to the processes and devices necessary for cooling, drying, and ventilating the several apartments so as to preserve their contents.

In this improvement I employ the same agencies for obtaining cool and dry air as described in the several patents granted to me February 28, 1865, to which I refer for additional explanations.

In the drawings, Figure 1 shows one mode of applying my invention to a granary. A $A^1$ $A^2$ are the bins for containing grains. B represents an apartment for cooling air by means of the low and uniform temperature which always exists at certain depths below the earth's surface, as fully explained in my former patent.

The pipe *p* brings a current of cooled water from subterranean coolers. As it passes through the pipe or coil *m* it cools the air in chamber B. The fan F, or other equivalent device for driving air, forces the cold air through the pipes S in the several apartments or bins A $A^1$, &c. These pipes pass in through the mass of grain in the bins, and by means of perforations, as shown, distribute the cold air through the grain. As the air is cooled in the separate apartments B, the moisture precipitated by the cooling will collect on the pipes or channels *m*, and on the walls of the apartment B, so that the air which enters the grain will be both dry and cool.

The body of the grain could be cooled by having the pipes *m* pass through the bins or in their walls; but to prevent the deposition of moisture the pipes should be surrounded by a perforated casing or jacket, as shown in Fig. 3, so that the moisture will be deposited between the casing and the pipes. Instead of having the air enter the grain in the bins by pipes S, the bins may be constructed as shown at $A^2$. The bin is made with a perforated lining, leaving a space, S′, which is connected with the air-blowing apparatus.

If it is desirable to cool the air still further, it may be compressed in the chamber B. The first effect of compression is to raise the temperature; but it will soon be cooled by the water flowing in the pipes *m*. As it is cooled the moisture in it will be deposited, and when it is permitted to expand and disseminate itself through the pipes S or spaces S′ it will both cool and dry the grain.

Fig. 2 shows another, and in some respects a better, mode of constructing a granary with my improvements. B is a chamber containing pipes *m*, connected with the subterranean cooler M. The air, partially cooled in B, is forced through the pipe *l* and subterranean coil N, where it is still further cooled, and then passed through the pipes S, or other equivalent device, into and through the bins.

If desired, the chamber B may be omitted, and the air forced directly into the reservoirs, channels, or pipes N, and then passed into the bins. By compressing the air in it, and then permitting it to expand as it enters the bins, it will be both cooled and dried.

Fig. 4 shows some modifications of the arrangements shown in Figs. 1 and 2. The chamber B contains the cold-water pipes *m*, and is opened at the top, so as to permit the free entry of the air. It may be surmounted by a hood or cowl. As the air is cooled it sinks through the pipe *l*; or it may be forced through these pipes by any suitable air-blowing apparatus, and may, when it is desired to obtain a very low temperature, be compressed in the coil N. As it is cooled moisture will be deposited, and a suitable tank, T, should be provided to receive the water which collects in the pipes N. To remove this water a pump, R, or other equivalent device, may be used. Similar arrangements should be provided with all the cooling apparatus, so as to remove the moisture deposited.

The principle of compressing air and cooling it while compressed, and then permitting it to expand, is one that may be applied in many different ways, and with great advantage in cooling and preserving grain; for by this process the air is thoroughly dried and cooled. A convenient mode of applying it is to have a strong reservoir in the ground, or in such position that it may be readily cooled. By any suitable air-forcing apparatus air is to be forced into this reservoir, and permitted to remain there till it acquires the temperature of the reservoir, and then let it expand and be conducted into the bins or apartments to be cooled.

For driving and compressing air any suitable source of power may be used. In large establishments a steam-engine or horse-power will generally be the most convenient; but in some situations the wind may be conveniently employed as the motive power, either by the aid of a windmill or by the force of the wind against the hood or cowl upon the top of the building, so as to force a current of air through the air passages and spaces.

The air-pipes *l* in Fig. 2, instead of passing through the earth, as shown at N, may be conducted through the ordinary water-pipes, as usually laid in cities.

By whatever means the cooling is effected, moisture or water will usually be deposited. Therefore it is always important to make suitable gutters or pipes to carry off the deposited water, so as to prevent its wetting the grain. Other modes of cooling the air may be employed, such as ice, freezing-mixtures, &c.

The process above described for cooling and drying the air, and for ventilating granaries, will, in nearly all cases, be sufficient to keep grain from being injured. The temperature may easily be kept so low as to prevent both insect and fungus growth of every kind. If, however, it is desired to still further dry grain for any purpose, a system of hot-air pipes of the usual construction may be connected so as to alternate with or take the place of the cold-air system above explained.

The air may also be dried by passing it over or through hygrometric or absorbent substances.

Having thus explained my invention, I wish it to be understood that I do not limit myself to the particular arrangement of devices shown in the drawings, since these may be greatly varied without departing from the principle of my invention.

What I claim as my invention is—

1. In an apparatus for preserving and restoring grain, the combination of a grain-bin, an air-forcing apparatus, means for cooling air, perforated distributing-pipes extending into the bin, and an air-pipe or air-pipes connecting the above.

2. In an apparatus for preserving and restoring grain, the combination of a grain-bin provided with perforated false sides, an air-forcing apparatus, means for cooling air, perforated pipes extending into the bin, and an air-pipe or air-pipes connecting the above.

3. In an apparatus for preserving and restoring grain, the combination of a grain-bin, an air-forcing apparatus, a cooling-chamber containing a system of cold-water pipes, and an air-pipe or air-pipes connecting the above, substantially as described.

4. In an apparatus for preserving and restoring grain, the combination of a grain-bin provided with means, substantially as described, for diffusing or distributing the air discharged thereinto, an air-forcing apparatus, a cooling-chamber containing a system of cold-water pipes, and an air-pipe or air-pipes connecting the above, substantially as described.

5. In an apparatus for preserving and restoring grain, the combination of a grain-bin, an air-forcing apparatus, a cooling-chamber containing a system of cold-water pipes, a subterranean cooler for cooling the water in said cold-water pipes, and an air-pipe or air-pipes connecting the said air-forcing apparatus, cooling-chamber, and grain-bin, substantially as described.

6. In an apparatus for preserving and restoring grain, the combination of a grain-bin provided with means, substantially as described, for diffusing or distributing the air discharged thereinto, an air-forcing apparatus, a cooling-chamber containing a system of cold-water pipes, a subterranean cooler for cooling the water in said cold-water pipes, and an air-pipe or air-pipes connecting the said air-forcing apparatus, cooling-chamber, and grain-bin, substantially as described.

7. In an apparatus for preserving and restoring grain, the combination of a grain-bin, an air-forcing apparatus, a subterranean air-cooler, and an air-pipe or air-pipes connecting the above, substantially as described.

8. In an apparatus for preserving and restoring grain, the combination of a grain-bin provided with means, substantially as described, for diffusing or distributing the air discharged thereinto, an air-forcing apparatus, a subterranean air-cooler, and an air-pipe or air-pipes connecting the above, substantially as described.

9. In an apparatus for preserving and restoring grain, the combination of a subterranean air-cooler, a tank for receiving the water of condensation, and means for withdrawing said water therefrom, substantially as described.

10. In an apparatus for storing grains, the combination of an air-duct, a system of cooling-pipes within said air-duct, which extend into the earth or a body of water or ice, a grain-bin provided with a perforated false bottom, or perforated distributing-pipes, or both, and an air-pipe or air-pipes connecting said air-duct and grain-bin, whereby air in the air-duct, becoming cooled, descends from the air-duct into the air-pipes automatically, and thence into the bin, substantially as described.

11. In an apparatus for preserving and restoring grain, the combination of a grain-bin, an air-forcing apparatus, an air-cooling chamber containing a system of cold-water pipes, a supplemental air cooler, and an air-pipe or air-pipes connecting the above.

D. E. SOMES.

Witnesses:
WM. MURPHY,
JNO. W. DRUMMOND.